United States Patent
Johnson et al.

(10) Patent No.: US 9,467,633 B2
(45) Date of Patent: Oct. 11, 2016

(54) HIGH DYNAMIC RANGE IMAGING SYSTEMS HAVING DIFFERENTIAL PHOTODIODE EXPOSURES

(71) Applicant: SEMICONDUCTOR COMPONENTS INDUSTRIES, LLC, Phoenix, AZ (US)

(72) Inventors: Richard Scott Johnson, Boise, ID (US); Robert M. Gravelle, Jr., Boise, ID (US); Brian W. Keelan, Boulder Creek, CA (US); Christopher D. Silsby, Albany, OR (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 14/633,837

(22) Filed: Feb. 27, 2015

(65) Prior Publication Data
US 2016/0255289 A1 Sep. 1, 2016

(51) Int. Cl.
*H04N 5/355* (2011.01)
*H04N 9/04* (2006.01)
*H04N 5/378* (2011.01)

(52) U.S. Cl.
CPC .............. *H04N 5/355* (2013.01); *H04N 5/378* (2013.01); *H04N 9/045* (2013.01)

(58) Field of Classification Search
CPC ....... H04N 5/355; H04N 9/045; H04N 5/378
USPC ........................................................ 348/273
See application file for complete search history.

(56) References Cited

U.S. PATENT DOCUMENTS

| | | | |
|---|---|---|---|
| 6,638,786 B2 | 10/2003 | Yamamoto | |
| 7,020,353 B1 | 3/2006 | McCaffrey et al. | |
| 7,491,920 B2 | 2/2009 | Lee et al. | |
| 7,511,716 B2 | 3/2009 | Berestov et al. | |
| 7,745,779 B2 | 6/2010 | Conners | |

(Continued)

FOREIGN PATENT DOCUMENTS

| | | |
|---|---|---|
| WO | 9909737 | 2/1999 |
| WO | 0052926 | 9/2000 |

OTHER PUBLICATIONS

Agranov et al., U.S. Appl. No. 14/012,403, filed Aug. 28, 2013.

(Continued)

*Primary Examiner* — Gevell Selby
(74) *Attorney, Agent, or Firm* — Treyz Law Group, P.C.; Michael H. Lyons

(57) ABSTRACT

Image sensors may include an array of photodiodes arranged in groups of adjacent photodiodes that generate charge in response to same-colored light. The image sensor may generate high-dynamic-range (HDR) images. To establish an effective exposure ratio between sets of photodiodes on the array for generating HDR images, microlenses may be formed over some photodiodes in a checkerboard pattern and may have portions that extend over other photodiodes in the array. Control circuitry may control photodiodes in each group to perform pulsed integration in which charge transfer control signals are intermittently pulsed for those photodiodes. A substantially opaque element may be formed over photodiodes in each of the groups such that the corresponding photodiodes generate signals in response to crosstalk. In this way, different effective exposures may be established across the array, allowing for HDR images to be generated without motion artifacts and with super-pixel resolution.

20 Claims, 8 Drawing Sheets

(56) References Cited

U.S. PATENT DOCUMENTS

| | | |
|---|---|---|
| 7,773,138 B2 | 8/2010 | Lahav et al. |
| 7,829,832 B2 | 11/2010 | Mauritzson et al. |
| 8,026,966 B2 | 9/2011 | Altice |
| 8,035,711 B2 | 10/2011 | Liu et al. |
| 8,130,304 B2 | 3/2012 | Yin et al. |
| 8,179,463 B1 | 5/2012 | Geurts |
| 8,599,284 B2 | 12/2013 | Mo et al. |
| 8,610,186 B2 | 12/2013 | Tanaka |
| 8,730,330 B2 | 5/2014 | Solhusvik et al. |
| 2008/0137207 A1* | 6/2008 | Jun ................... G02B 3/0006 359/626 |
| 2009/0033788 A1* | 2/2009 | Machida ............. H04N 5/374 348/360 |
| 2009/0108176 A1 | 4/2009 | Blanquart |
| 2010/0025788 A1* | 2/2010 | Konishi ............. H04N 5/335 257/432 |
| 2010/0149393 A1 | 6/2010 | Zarnowski et al. |
| 2011/0018080 A1* | 1/2011 | Ootake ............. H01L 27/14621 257/432 |
| 2012/0002089 A1 | 1/2012 | Wang et al. |
| 2012/0193515 A1* | 8/2012 | Agranov ............. G01S 3/782 250/208.1 |
| 2013/0242148 A1 | 9/2013 | Mlinar et al. |
| 2014/0022354 A1* | 1/2014 | Okigawa ............. H04N 5/347 348/46 |
| 2015/0002709 A1 | 1/2015 | Masagaki |
| 2015/0054996 A1* | 2/2015 | Minagawa ......... H04N 5/35563 348/300 |

OTHER PUBLICATIONS

Mauritzson et al., U.S. Appl. No. 14/295,203, filed Jun. 3, 2014.
Korobov et al., U.S. Appl. No. 14/290,814, filed May 29, 2014.

* cited by examiner

HIGH DYNAMIC RANGE IMAGING SYSTEMS HAVING DIFFERENTIAL PHOTODIODE EXPOSURES

BACKGROUND

This relates generally to imaging devices, and more particularly, to imaging devices with photodiodes having sub-pixel resolution capabilities.

Image sensors are commonly used in electronic devices such as cellular telephones, cameras, and computers to capture images. In a typical arrangement, an electronic device is provided with an array of image pixels arranged in pixel rows and pixel columns. Circuitry is commonly coupled to each pixel column for reading out image signals from the image pixels. The image pixels contain a single photodiode for generating charge in response to image light.

Conventional imaging systems employ a single image sensor in which the visible light spectrum is sampled by red, green, and blue (RGB) image pixels arranged in a Bayer mosaic pattern. The Bayer Mosaic pattern consists of a repeating cell of two-by-two image pixels, with two green pixels diagonally opposite one another, and the other corners being red and blue.

In certain applications, it may be desirable to capture high-dynamic range images. While highlight and shadow detail may be lost using a conventional image sensor, highlight and shadow detail may be retained using image sensors with high-dynamic-range imaging capabilities.

Common high-dynamic-range (HDR) imaging systems use multiple images that are captured by the image sensor, each image having a different exposure time. Captured short-exposure images may retain highlight detail while captured long-exposure images may retain shadow detail. In a typical device, alternating pairs of rows of pixels capture short and long exposure images to avoid breaking up the Bayer mosaic pattern across exposure times, which can limit the spatial resolution. Performing HDR imaging by generating multiple images captured with different total exposure times for each frame may generate undesirable motion artifacts in the final HDR image.

It would therefore be desirable to be able to provide imaging devices with improved means of generating HDR images.

DETAILED DESCRIPTION

Electronic devices such as digital cameras, computers, cellular telephones, and other electronic devices may include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
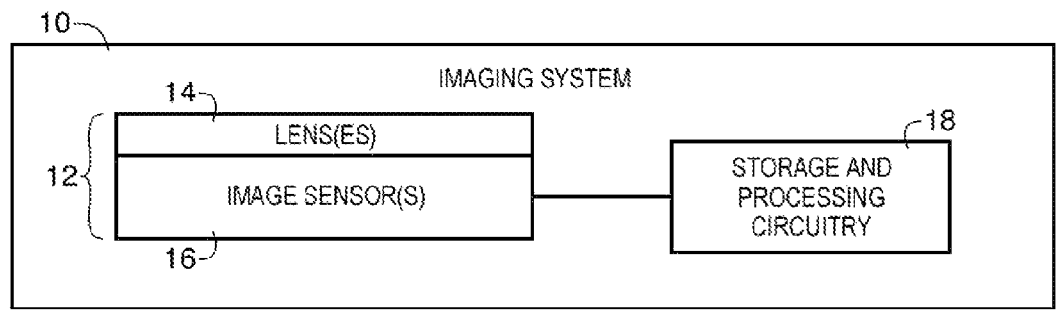
FIG. 1 is a diagram of an illustrative electronic device having an image sensor and processing circuitry for capturing images using an array of image pixels having photosensitive regions with sub-pixel resolution capabilities and differential effective exposures in accordance with an embodiment of the present invention.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. Camera module 12 may be used to convert incoming light into digital image data. Camera module 12 may include one or more lenses 14 and one or more corresponding image sensors 16. Lenses 14 may include fixed and/or adjustable lenses and may include microlenses formed on an imaging surface of image sensor 16. During image capture operations, light from a scene may be focused onto image sensor 16 by lenses 14. Image sensor 16 may include circuitry for converting analog pixel data into corresponding digital image data to be provided to storage and processing circuitry 18. If desired, camera module 12 may be provided with an array of lenses 14 and an array of corresponding image sensors 16.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, external display, or other device) using wired and/or wireless communications paths coupled to processing circuitry 18.

Figure 2:
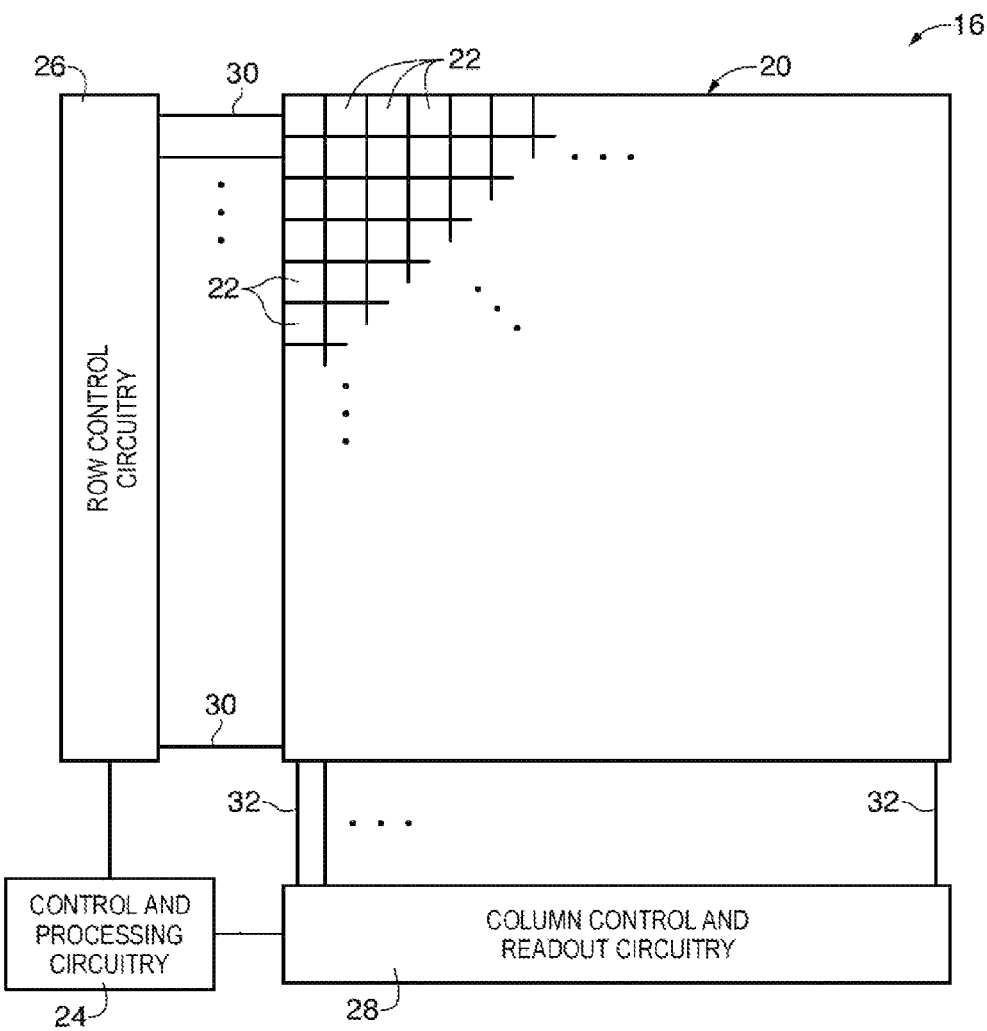
FIG. 2 is a diagram of an illustrative pixel array and associated readout circuitry for reading out image signals from the pixel array in accordance with an embodiment of the present invention.

As shown in FIG. 2, image sensor 16 may include a pixel array 20 containing image sensor pixels 22 arranged in rows and columns (sometimes referred to herein as image pixels or pixels) and control and processing circuitry 24. Array 20 may contain, for example, hundreds or thousands of rows and columns of image sensor pixels 22. Control circuitry 24 may be coupled to row control circuitry 26 and image readout circuitry 28 (sometimes referred to as column control circuitry, readout circuitry, processing circuitry, or column decoder circuitry). Row control circuitry 26 may receive row addresses from control circuitry 24 and supply corresponding row control signals such as reset, row-select, charge transfer, dual conversion gain, and readout control signals to pixels 22 over row control paths 30. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32.

Image readout circuitry 28 may receive image signals (e.g., analog pixel values generated by pixels 22) over column lines 32. Image readout circuitry 28 may include sample-and-hold circuitry for sampling and temporarily storing image signals read out from array 20, amplifier circuitry, analog-to-digital conversion (ADC) circuitry, bias circuitry, column memory, latch circuitry for selectively enabling or disabling the column circuitry, or other circuitry that is coupled to one or more columns of pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Image readout circuitry 28 may supply digital pixel data to control and processing circuitry 24 and/or processor 18 (FIG. 1) over path 25 for pixels in one or more pixel columns.

If desired, image pixels 22 may include one or more photosensitive regions for generating charge in response to image light. Photosensitive regions within image pixels 22 may be arranged in rows and columns on array 20. Pixel array 20 may be provided with a color filter array having multiple color filter elements which allows a single image sensor to sample light of different colors. As an example, image sensor pixels such as the image pixels in array 20 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.). These examples are merely illustrative and, in general, color filter elements of any desired color and in any desired pattern may be formed over any desired number of image pixels 22.

Figure 3:
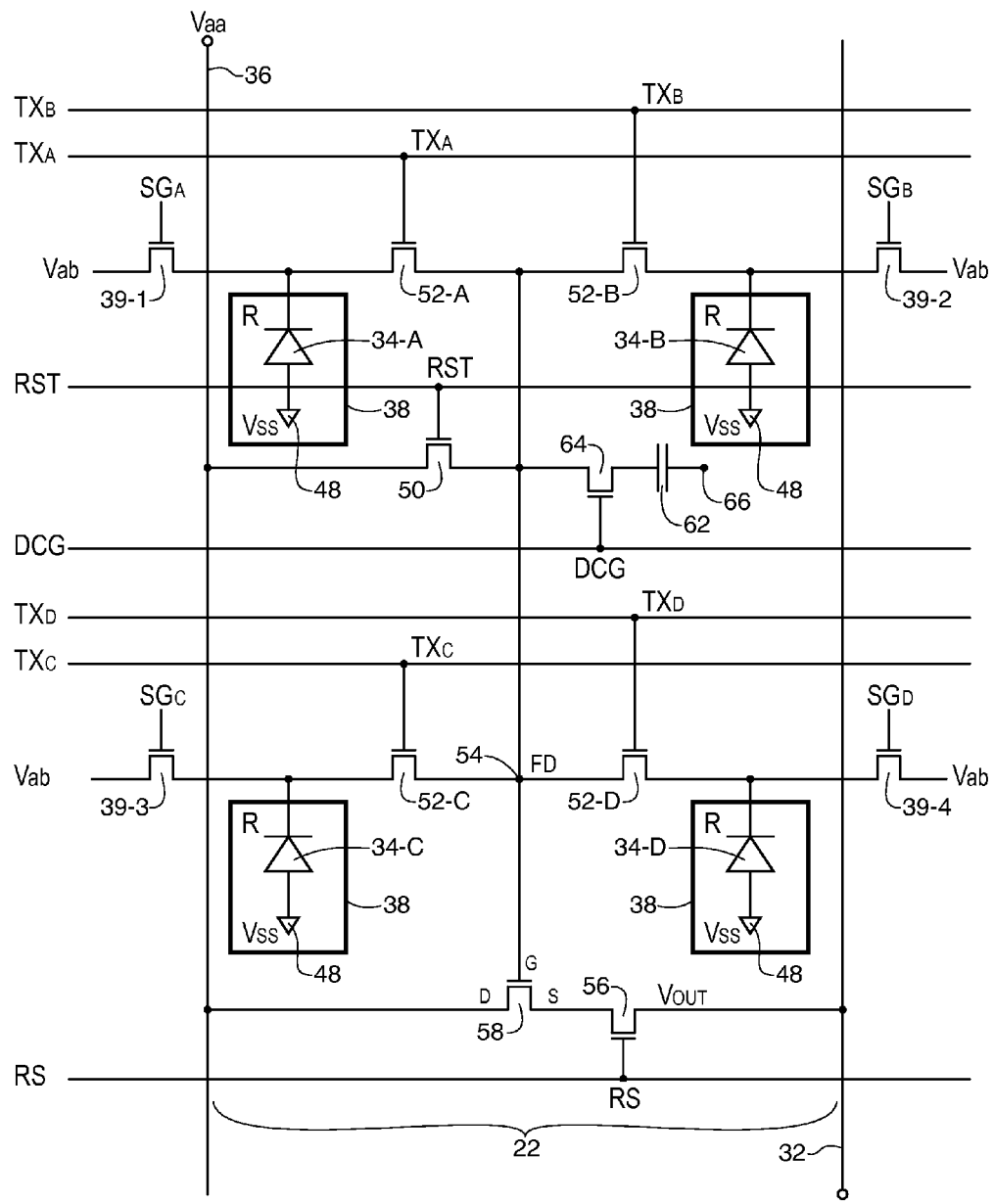
FIG. 3 is a circuit diagram of an illustrative image sensor pixel having multiple photodiodes (e.g., multiple sub-pixels) with a shared charge storage region and differential effective exposures and having gates that may optionally be operated in a pulsed integration mode in accordance with an embodiment of the present invention.

FIG. 3 is a circuit diagram of an illustrative image sensor pixel 22 having multiple photosensitive regions 34. As shown in FIG. 3, image pixel 22 may include multiple photosensitive regions (photosensitive elements) such as photodiodes 34 (e.g., a first photodiode 34-A, a second photodiode 34-B, a third photodiode 34-C, and a fourth photodiode 34-D). A positive power supply voltage (e.g., voltage Vaa or another reset-level voltage) may be supplied at positive power supply terminal 36. A ground power supply voltage (e.g., Vss) may be supplied at ground terminals 48. Incoming light may be collected by photosensitive elements such as photodiodes 34 after passing through corresponding color filter structures such as color filter elements 38.

In the example of FIG. 3, each photodiode 34 is provided with a respective red (R) color filter element 38 so that photodiodes 34 generate charge in response to red light. In one suitable arrangement, color filter elements 38 covering each photodiode 34 in pixel 22 may all be the same color (e.g., red, blue, green, yellow, clear, etc.). Color filter elements 38 may be formed from a single continuous color filter element that covers each of photodiodes 34 (sometimes referred to herein as a color plane), may be formed from multiple color filter elements that cover multiple photodiodes 34 (e.g., a single color filter element may cover a first pair of photodiodes 34, a single color filter element may cover a second pair of photodiodes 34, etc.), or may be formed from separate distinct color filter elements that each cover a corresponding photodiode 34. Photodiodes 34 convert the incoming light that passes through the corresponding color filter element into electrical charge.

If desired, control circuitry 26 (as shown in FIG. 2) may assert reset control signal RST before an image is acquired. This turns on reset transistor 50 and resets charge storage node 54 (also referred to as floating diffusion node FD or floating diffusion region FD) to Vaa or another reset-level voltage. Charge storage node 54 may be shared by each photosensitive region 34 in pixel 22 and may store charge generated by each photosensitive region 34 in pixel 22. Charge storage node 54 may be implemented using a region of doped semiconductor (e.g., a doped silicon region formed in a silicon substrate by ion implantation, impurity diffusion, or other doping techniques). The doped semiconductor region (i.e., the floating diffusion FD) exhibits a capacitance that can be used to store the charge that has been transferred from photodiodes 34 (e.g., region 54 may have a corresponding charge capacity indicative of the amount of charge that can be stored at region 54). The signal associated with the stored charge on node 54 is conveyed to row select transistor 56 by source-follower transistor 58.

Each photodiode 34 in pixel 22 may be coupled to shared charge storage region 54 through a corresponding charge transfer gate 52 (e.g., a first charge transfer gate 52-A may be coupled between photodiode 34-A and node 54, a second charge transfer gate 52-B may be coupled between photodiode 34-B and node 54, a third charge transfer gate 52-C may be coupled between photodiode 34-C and node 54, and a fourth charge transfer gate 52-D may be coupled between photodiode 34-D and node 54). Control circuitry 26 may provide corresponding charge transfer control signals TX to the gate terminal of each charge transfer gate 52 (e.g., may provide a first charge transfer control signal $TX_A$ to charge transfer gate 52-A, may provide a second charge transfer control signal $TX_B$ to charge transfer gate 52-B, etc.).

The reset control signal RST may be deasserted to turn off reset transistor 50. After the reset process is complete, transfer gate control signals TX may be asserted to turn on corresponding transfer gates 52. When transfer transistors 52 are turned on, the charge that has been generated by the corresponding photodiode 34 in response to incoming light is transferred to shared charge storage node 54. Transfer gates TX may be pulsed once to perform one charge transfer operation or may be pulsed multiple times to perform multiple charge transfer operations (e.g., to extend the effective charge well capacity of the corresponding photodiodes). When it is desired to read out the value of the stored charge (i.e., the value of the stored charge that is represented by the signal at the source S of transistor 58), row select control signal RS may be asserted. When signal RS is asserted, transistor 56 turns on and a corresponding image signal $V_{OUT}$ that is representative of the magnitude of the charge on shared charge storage node 54 (e.g., a reset-level or an image-level voltage from one or more photodiodes 34 in pixel 22) is produced on output path 32. In a typical configuration, there are numerous rows and columns of image pixels such as image pixel 22 in image pixel array 20. When row select control signal RS is asserted in a given row, a path such as column line 32 may be used to route signal $V_{OUT}$ from that image pixel to readout circuitry such as image readout circuitry 28 of FIG. 2. If desired, reset-levels and image-levels may be sampled, held, and converted for each image pixel 22 to allow for kTc reset noise compensation, for example.

In one suitable arrangement, charge may be transferred (e.g., constructively transferred) from each photodiode 34 of pixel 22 to shared charge storage region 54 and image signals corresponding to a sum of the transferred charges (e.g., the charge generated by each of photodiodes 34) may be stored at region 54 and readout over column line 32. In another suitable arrangement, charge may be transferred from a single photodiode 34 to shared charge storage node 54 at a time, two photodiodes 34 at a time, etc. Pixels 22 may be provided with gain selection circuitry that enhances the dynamic range of the images produced by image sensor 16. For example, each pixel may generate a corresponding output value using a selected gain setting. In some configurations, a selected gain setting may depend on the amount of light captured by the pixel during any given exposure (e.g., an integration period between resets of the pixel during which a photosensitive element generates charges in response to incoming light). In other configurations, the gain may be kept at a constant setting.

As shown in FIG. 3, image pixel 22 may include capacitor 62 and transistor 64 coupled in series between terminal 66 and shared floating diffusion node 54. In one suitable arrangement, terminal 66 may be coupled to positive power supply voltage Vaa. In another suitable arrangement, terminal 66 may be coupled to ground power supply Vss. Transistor 64 may have a gate terminal that is controlled using dual conversion gain signal DCG. Pixel 22 may be operable in a high conversion gain mode and in a low conversion gain mode. If transistor 64 is disabled (e.g., if signal DCG is low), pixel 22 is placed in the high conversion gain mode. If transistor 64 is enabled (e.g., if signal DCG is high), pixel 22 is placed in the low conversion gain mode.

If desired, sub-pixels 34 may each include a shutter gate such as shutter gate 39. Shutter gate 39 may have a gate terminal that is controlled by shutter control signal SG (e.g., sub-pixel 34-A may include shutter gate 39-1 controlled by control signal $SG_A$, sub-Pixel 34-B may include shutter gate 39-2 controlled by control signal $SG_B$, etc.). Asserting shutter control signal SG turns on shutter gate 39 and resets photodiode 34 to power supply voltage Vab or any other desired voltage (e.g., by connecting Vab to photodiode 34 through shutter gate 39). Gates 39 may be coupled between photodiodes 34 and one or more charge blooming nodes (not shown). When signal SG is deasserted, photodiode 34 may be allowed to accumulate photo-generated charge.

Because charge is allowed to accumulate on photodiode 34 when signal SG is deasserted (i.e., when SG is low), the OFF state of transistor 39 may correspond to an open electronic shutter for sub-pixel 34. Similarly, because photodiode 34 is reset to power supply voltage Vab when signal SG is asserted (i.e., when SG is high), the ON state of transistor 39 may correspond to a closed electronic shutter for sub-pixel 34. In general, an "open" electronic shutter may be used herein to refer to the state in which photodiode 34 is allowed to accumulate charge (i.e., the state in which transistor 39 is deasserted), whereas a "closed" electronic shutter may be used herein to refer to the state in which photodiode 34 is reset to power supply voltage Vab (i.e., the state in which transistor 39 is asserted). Gates SG and TX may be intermittently pulsed on and off to perform pulsed integration operations using one or more of photodiodes 34. If desired, gates SG in some of photodiodes 34 of a given pixel 22 may be used to perform anti-blooming operations (e.g., to prevent excess charge from overflowing from one photodiode onto adjacent photodiodes or charge storage regions).

In the example of FIG. 3, four photodiodes 34 are arranged in two adjacent (e.g., consecutive) rows and two adjacent columns. This example is merely illustrative. In general, pixel 22 may be defined as any number of adjacent photodiodes 34 sharing a common charge storage node 54 and that are provided with a commonly colored color filter element. For example, pixel 22 may include one photodiode 34, two photodiodes 34 that share a single floating diffusion node 54, reset gate 50, and row select gate 56, three photodiodes 34 that share a single floating diffusion node 54, reset gate 50, and row select gate 56, more than four photodiodes 34 that share a single floating diffusion node 54, reset gate 50, and row select gate 56, etc. Photodiodes 34 within pixels 22 may be arranged in any desired manner. For example, each photodiode 34 in a given pixel 22 may be arranged in a single row, a single column, multiple adjacent rows, or multiple adjacent columns.

Photosensitive regions 34 within pixel 22 may sometimes be referred to herein as sub-pixels 34 or photodiodes 34 (e.g., sub-pixels that share a common charge storage region within an associated pixel 22). Pixels 22 may sometimes be referred to herein as a super-pixel 22, because pixels 22 may include multiple sub-pixels 34. Sub-pixels 34 provided with red color filter elements may sometimes be referred to herein as red sub-pixels 34, sub-pixels provided with blue color filter elements may sometimes be referred to herein as blue sub-pixels 34, sub-pixels 34 provided with green color filter elements may sometimes be referred to herein as green sub-pixels 34, sub-pixels 34 provided with broadband color filter elements may sometimes be referred to herein as broadband sub-pixels 34, etc. Each pixel 22 in array 20 may sometimes be referred to herein as a cluster of sub-pixels, a cluster of photodiodes, a cluster of photosensitive regions, a group of subpixels, a group of photosensitive regions, or a group of photodiodes. A cluster 22 of photodiodes 34 may be defined herein such that each photodiode of the cluster is formed adjacent to another photodiode of that cluster on array 20 and such that each photodiode of the cluster provided with the same colored color filter elements. In the example of FIG. 3, sub-pixel cluster 22 is formed with red color filter elements 38 and generates red image signals in response to image light.

Figure 4:
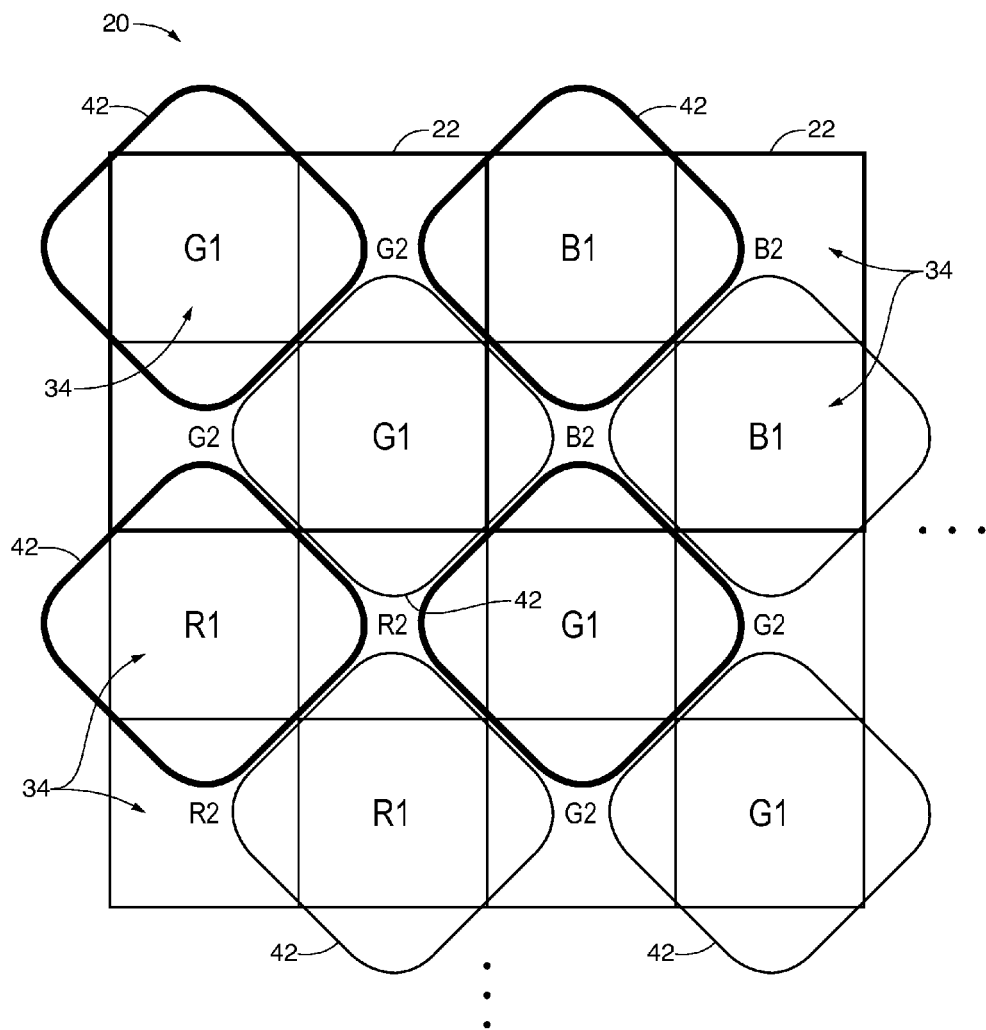
FIG. 4 is a diagram of an illustrative pixel array having sub-pixels with shared charge storage nodes and microlenses formed in a checkerboard pattern over the array so that the sub-pixels are provided with desired differential effective exposures for generating high-dynamic-range images in accordance with an embodiment of the present invention.

If desired, the pixel 22 shown in FIG. 3 may be formed adjacent to two pixels 22 covered with green color filter elements 38 (e.g., two pixels 22 each having four green sub-pixels 34) that are diagonally opposite to one another and may be formed diagonally opposite to a pixel 22 covered with blue color filter elements 38 (e.g., a pixel 22 having four blue sub-pixels 34) to form a unit cell of repeating pixels 22. This pattern (unit cell) of pixels 22 may be repeated across array 20. In this way, a Bayer mosaic pattern of pixels 22 may be formed across array 20, where each pixel 22 includes four sub-pixels 34 arranged in two corresponding adjacent rows and two corresponding adjacent columns, having a shared charge storage region 54, and that generate image signals in response to a corresponding color of light. FIG. 4 is an illustrative diagram showing how four pixels 22 each including four sub-pixels 34 may form a repeating Bayer mosaic pattern of pixels across array 20 in this scenario.

If desired, image sensor 16 may be operated in a high-dynamic-range imaging mode. The dynamic range of an image may be defined as the luminance ratio of the brightest element in a given scene to the darkest element the given scene. Typically, cameras and other imaging devices capture images having a dynamic range that is smaller than that of real-world scenes. High-dynamic-range (HDR) imaging systems are therefore often used to capture representative images of scenes that have regions with high contrast, such as scenes that have portions in bright sunlight and portions in dark shadows.

An image may be considered an HDR image if it has been generated using imaging processes or software processing designed to increase dynamic range. As an example, HDR images may be captured by a digital camera using a multiple integration (or multiple exposure (ME)) process. In a multiple exposure process, multiple images (sometimes referred to as image frames) of the same scene may be captured using different exposure times (sometimes referred to as integration times). A short-exposure image captured during a short integration time may better capture details of brightly lit portions of the scene, whereas a long-exposure image captured during a relatively longer integration time may better capture details of dark portions of the scene. The short-exposure and long-exposure images may be combined into a composite HDR image which is able to represent the brightly lit as well as the dark portions of the image.

In another suitable arrangement, HDR images may be captured by a digital camera using an interleaved integration (or interleaved exposure (IE)) process. In an interleaved integration process, images having rows of long-exposure image pixel values are interleaved with rows of short-exposure image pixel values. The long-exposure and short-exposure image pixel values in each interleaved image frame may be interpolated to form interpolated values. A long-exposure image and a short-exposure image may be generated using the long-exposure and the short-exposure values from the interleaved image frame and the interpolated. The long-exposure image and the short-exposure image may be combined to produce a composite HDR image which is able to represent the brightly lit as well as the dark portions of the image. Integration time may be controlled on array 20 by, for example, controlling the timing of reset signals RST and charge transfer signals TX provided to pixels 22, etc.

The example in which high-dynamic-range images are generated by adjusting integration time is merely illustrative. In another suitable arrangement, an effective integration or effective exposure level (e.g., an effective amount of charge that can be captured by photodiodes 34 in a given time) may be provided for each sub-pixel 34 through other techniques that adjust the effective sensitivity (sometimes referred to herein as effective exposure) or the effective amount of charge generated at each photodiode 34 for a given period of time. In general, a non-unity effective exposure ratio between at least two sets of sub-pixels 34 needs to be maintained in order to perform high-dynamic-range imaging (e.g., in order to generate images having extended dynamic range).

In one suitable arrangement, a pattern of microlenses may be formed over array 20 to provide a differential effective exposure between two or more sets of photodiodes 34 for performing HDR imaging. For example, microlenses may be formed over an upper surface of a color filter layer (e.g., a layer on which the color filter elements are formed) for array 20. Each microlens may focus incoming light onto a particular photodiode 34.

In the example of FIG. 4, array 20 may be provided with a pattern of microlenses 42 formed over an upper surface of array 20. As shown in FIG. 4, microlenses 42 may be centered over every-other photodiode 34 in a checkerboard pattern. Each microlens 42 may have portions that extend over neighboring photodiodes 34 on the array. Each microlens 42 may preferentially direct light to the photodiode over which that microlens is centered. For example, the microlens formed over the photodiode 34 located in the first row and first column of array (e.g., centered about sub-pixel G1 in row 1, column 1) may direct light incident on that photodiode as well as light incident on the immediately adjacent photodiodes in the same row and column. In this way, microlens 42 may direct most of the light incident on array 20 onto a subset of all of the photodiodes 34 on array 20 (e.g., onto half of the photodiodes 34 on array 20). As more light is directed onto photodiodes having corresponding centered microlenses, photodiodes over which microlenses are centered will have a higher effective exposure (sensitivity) than photodiodes over which microlenses are not centered. In this way, a differential exposure (e.g., a non-unity exposure ratio) may be generated between sub-pixels 22 having centered microlenses 42 and sub-pixels 22 without corresponding centered microlenses.

As shown in FIG. 4, green sub-pixels having a relatively high effective sensitivity (e.g., green sub-pixels 34 having a corresponding centered microlens 42) are labeled "G1," red sub-pixels having a relatively high effective sensitivity are labeled "R1," blue sub-pixels having a relatively high effective sensitivity are labeled "B1," green sub-pixels having a relatively low sensitivity (e.g., green sub-pixels 34 that are not formed below the center of a corresponding microlens 42) are labeled "G2," red sub-pixels having a relatively low effective sensitivity are labeled "R2," and blue sub-pixels having a relatively low effective sensitivity are labeled "B2." By establishing an effective sensitivity differential between green sub-pixels G1 and G2, between red sub-pixels R1 and R2, and between blue sub-pixels B1 and B2, HDR images may be generated for array 20.

The example of FIG. 4 is merely illustrative. In general, any desired color filter elements may be used in any desired pattern. Microlenses 42 may be formed such that each microlens abuts or contacts an adjacent microlens 42 to minimize any gaps between the microlenses and to maximize the light collecting area of the microlens (e.g., thereby maximizing the effective sensitivity of sub-pixels G1, R1, and B1). In general, microlenses 42 may have any desired shape. For example, microlenses 42 may be substantially circular, elliptical, square, rectangular, etc. If desired, portions of each microlens 42 may overlap with other microlenses 42 on the surface of array 20.

While the microlenses are described herein as being "centered" over a corresponding sub-pixel, the microlenses need not be centered over the center of the corresponding sub-pixel. For example, each microlens may have a center (e.g., central axis or center axis) that is located over the center of the corresponding sub-pixel or that is offset with respect to the center of the corresponding sub-pixel (e.g., the center axis of each microlens may be formed over a portion of the corresponding sub-pixel or, in some scenarios, over a portion of a neighboring pixel if that sub-pixel is still optically aligned with its corresponding sub-pixel). In general, each microlens 42 may be "optically aligned" with its corresponding sub-pixel G1/R1/B1 such that light is focused into that sub-pixel. Different microlenses 42 in the array may be offset with respect to the sub-pixel to which the microlenses are optically aligned by different amounts based on the location of that sub-pixel in the array.

For example, in the center of an imaging array, along the optical axis of the camera lens 14, the cone of light rays transmitted by camera lens 14 is symmetric, and the optimum placement of a radially symmetric microlens is directly over the corresponding photodiode (e.g., without significant offset or any offset with respect to the center of the photodiode). However, away from the center of the array, the light come of lens 14 no longer lies on the camera lens' optical axis, and for most lens designs, the light cone is tilted by an amount referred to as the chief ray angle. To compensate for the resulting misalignment, microlenses 42 may be shifted slightly along a radial line over the array towards the center of the array by an amount determined by the chief ray angle at that distance from the optical axis. This adjustment optically aligns the microlenses 42 with their corresponding photodiodes 34, to maximize signal in those photodiodes, while minimizing spurious signal generation in adjacent photodiodes. Optical alignment of the microlenses in the present invention may be important for maximizing the optical exposure ratio between higher-exposure (e.g., G1/B1/R1) and lower-exposure (e.g., G2/B2/R2) sub-pixels. While microlenses are described herein as being centered over a corresponding sub-pixel, each microlens may be optically aligned over the corresponding sub-pixel to account for the chief ray angle of lens 14 based on the location of that sub-pixel in the plane of the pixel array.

Figure 5:
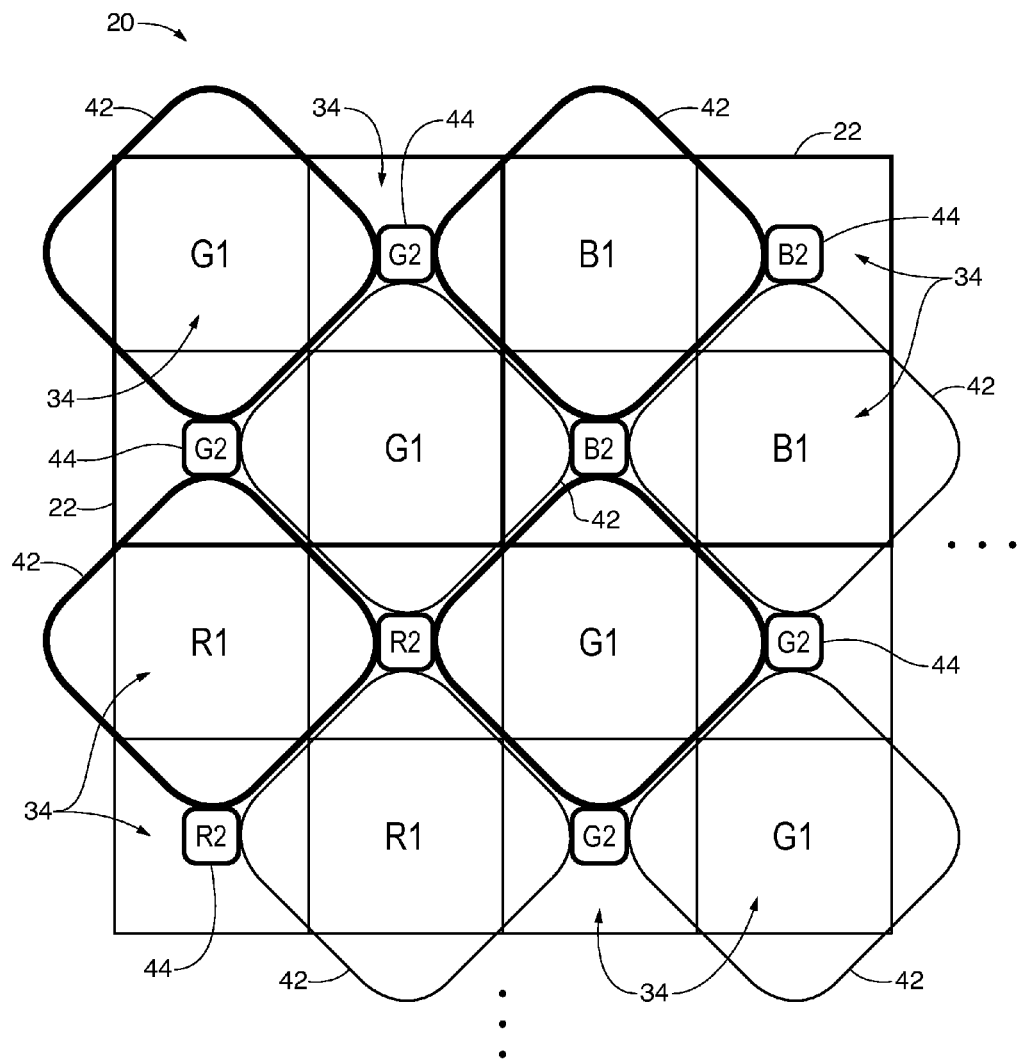
FIG. 5 is a diagram of an illustrative pixel array having sub-pixels with shared charge storage nodes, a first set of relatively large-area microlenses formed in a checkerboard pattern over the array, and a second set of relatively small-area microlenses formed in a checkerboard pattern over the array, such that the sub-pixels are provided with desired differential effective exposures for generating high-dynamic-range images in accordance with an embodiment of the present invention.

If desired, microlenses may be formed over the relatively low effective sensitivity sub-pixels on array 20 (e.g., over sub-pixels G2, B2, and R2). FIG. 5 is an illustrative diagram showing how low sensitivity sub-pixels 34 may be provided with corresponding microlenses 44 (e.g., such that microlenses 44 are centered over a corresponding low sensitivity sub-pixel). Microlenses 44 may have a smaller size (e.g., a smaller light collecting area that does not extend over adjacent sub-pixels 34) than microlenses 42 associated with high sensitivity sub-pixels 34. In other words, the pattern of microlenses formed over array 20 may include a first set of relatively high light collecting area microlenses 42 for providing light to relatively high effective sensitivity sub-pixels 34 (e.g., sub-pixels R1, G1, and B1) and a second set of relatively low light collecting area microlenses 44 for providing light to relatively low effective sensitivity sub-pixels 34 (e.g., sub-pixels G2, B2, and R2). The relative sizes and shapes of microlenses 44 and 42 may be selected such that a desired effective exposure ratio is established between the low effective sensitivity sub-pixels 34 and the high effective sensitivity sub-pixels 34. The particular effective exposure ratio that is established may allow image sensor 16 to generate HDR images having a desired amount of extended dynamic range.

The example of FIG. 5 is merely illustrative. In general, microlenses 44 may have any desired shape. For example, microlenses 44 may have the same shape as microlenses 42 or may have a different shape than microlenses 42. Microlenses 44 may be rectangular, square, circular, elliptical, or any other desired shape. If desired, microlenses 44 may overlap with adjacent microlenses 42. In another suitable arrangement, small area microlenses 44 may have a negative curvature such that image light is directed away from low-sensitivity sub-pixels G2/B2/R2 (e.g., as opposed to focusing light onto those sub-pixels), further reducing the effective exposure associated with those sub-pixels. If desired, microlenses 44 having negative curvature may redirect light away sub-pixels G2/B2/R2 and onto sub-pixels G1/B1/R1.

Figure 6:
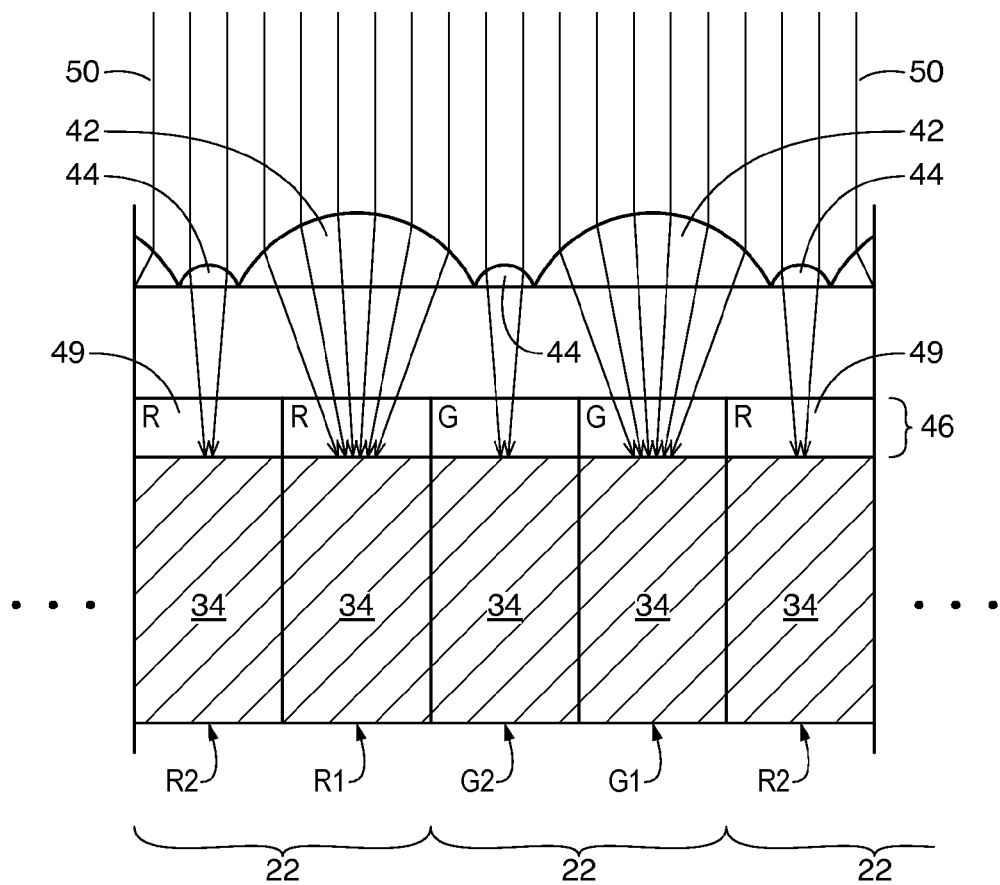
FIG. 6 is a cross-sectional diagram showing how an illustrative pixel array of the type shown in FIG. 5 may provide different amounts of lights to different sub-pixels in the array so that the sub-pixels exhibit different effective exposure levels for performing high-dynamic-range imaging in accordance with an embodiment of the present invention.

FIG. 6 is an illustrative cross-sectional diagram of two adjacent image pixels 22 in array 20 having a repeating pattern of relatively high and relatively low light collecting area microlenses (e.g., a red image pixel 22 including four adjacent red sub-pixels 34 and a green image pixel 22 including four adjacent green sub-pixels as shown in FIG. 5). As shown in FIG. 6, a color filter array such as color filter array 46 may be formed over photosensitive regions 34 in array 20 so that a desired color filter element 49 in color filter array 46 is formed over an upper surface of the photosensitive region 34 of an associated pixel 22. Low light collecting area microlenses 44 may be formed over a first set of sub-pixels 34 such that those sub-pixels 34 have a low effective exposure level (e.g., microlenses 44 may be centered over sub-pixels R2, G2, and R2). High light collecting area microlenses 42 may be formed over a second set of sub-pixels 34 such that those sub-pixels 34 have a high effective exposure level (e.g., microlenses 42 may be centered over sub-pixels R1 and G1). Large microlenses 42 may have portions that extend over adjacent sub-pixels 34 (e.g., over adjacent R2 and G2 sub-pixels) such that some of the light incident on those adjacent sub-pixels 34 is redirected (focused) onto the sub-pixel associated with each large microlens 42. In this way, large microlenses 42 may gather more light than small microlenses 44 and may therefore increase the effective exposure for high effective exposure sub-pixels R1/G1/B1 relative to low effective exposure sub-pixels R2/G2/B2 (e.g., for a given integration time). By adjusting the effective exposure ratio of sub-pixels 34 across array 20 (e.g., using differential microlens sizes or microlenses only over a subset of the sub-pixels), the integration time used for each sub-pixel 34 to capture light may be approximately equal for all sub-pixels 34 across array 20, thereby reducing the presence of motion artifacts in the final image relative to scenarios where different integration times are used across array 20.

Microlenses 42 and/or 44 may be formed over a surface of array 20 using any desired microlens manufacturing technique. For example, microlenses 42 may include a first subset of microlenses 42 (indicated by bold lines in FIG. 4) and a second subset of microlenses 42 (indicated by narrow lines). During assembly of image sensor 16 (e.g., in a manufacturing environment such as an integrated circuit fabrication system), the first subset of microlenses 42 may be deposited at a first time and the second subset of microlenses 42 may be deposited at a second time that is subsequent to the first time. As an example, a primary reticle may be used to deposit the first subset of microlenses 42 on array 20 whereas a secondary reticle may be used to produce the second subset of microlenses 42. The secondary reticle may allow for the second subset of microlenses 42 to overlap with the first subset. In this way, gaps between each of microlenses 42 may be minimized (thereby improving the light collecting ability of the microlenses). In another suitable arrangement, all of microlenses 42 may be deposited using a single reticle and a top conformal coating (e.g., a dielectric layer having similar optical properties as the materials used to form microlenses 42) may be deposited over microlenses 42 to fill in any gaps between the microlenses (thereby improving the light collecting ability of the microlenses). Small microlenses 44 may be produced through a similar method as large microlenses 42 or by any other desired method.

For some applications, such as consumer photography, a 2-exposure HDR can provide sufficient dynamic range in the final HDR image (e.g., an HDR imaging process having relatively low effective exposure level sub-pixels such as sub-pixels R2/B2/G2 and relatively high effective exposure level sub-pixels such as sub-pixels R1/B1/G1). However, in many applications (e.g., automotive imaging applications, security applications, machine vision applications, etc.), a greater dynamic range than that provided by a 2-exposure HDR may be desirable.

Figure 7:
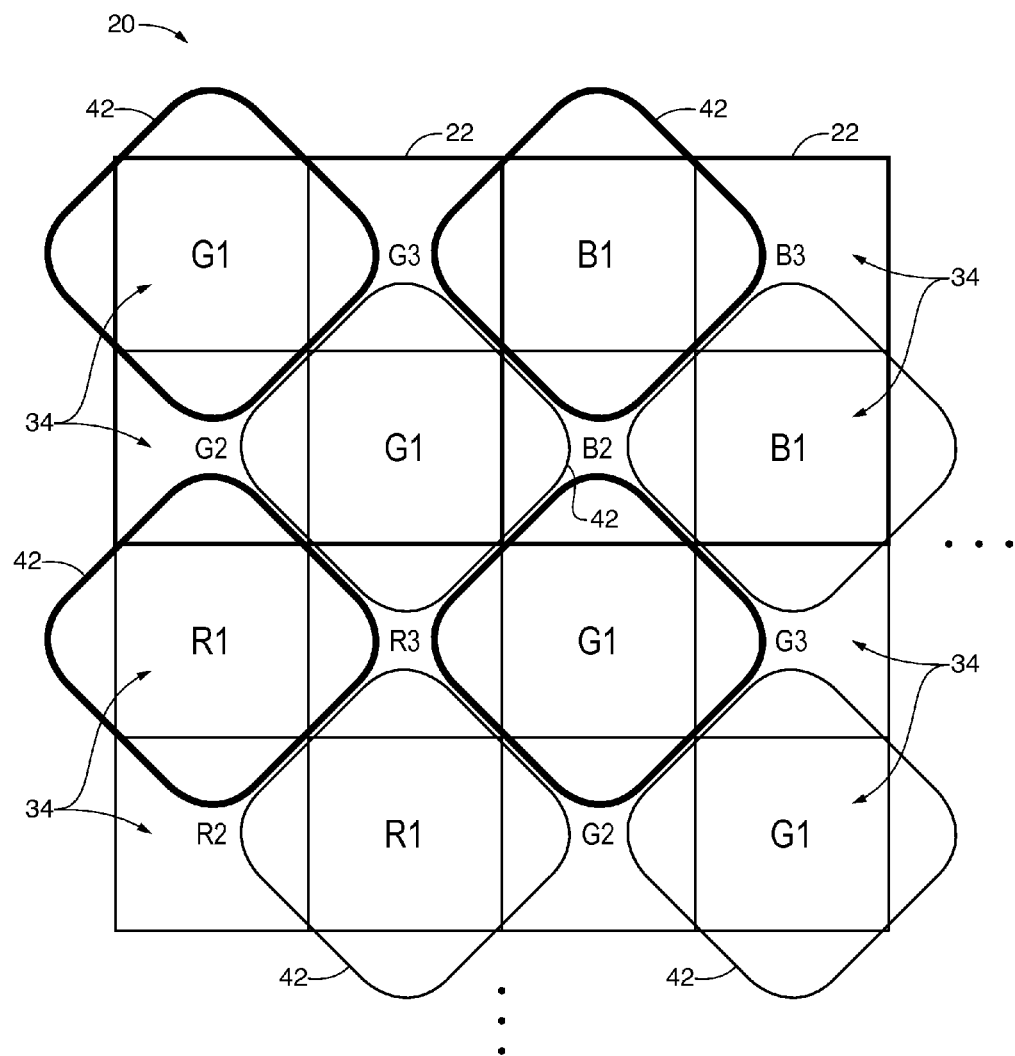
FIG. 7 is a diagram of an illustrative pixel array having sub-pixels with shared charge storage nodes, microlenses formed over the array so that first and second sets of the sub-pixels have first and second different effective exposures, and a third set of sub-pixels that is operated in a pulsed integration mode to exhibit a third effective exposure for generating high-dynamic-range images in accordance with an embodiment of the present invention.

If desired, a third effective exposure may be used for a set of sub-pixels 34 on array 20. In this scenario, the exposure of a subset of the relatively low effective exposure sub-pixels R2/G2/B2 (e.g., sub-pixels without corresponding centered microlenses or formed with low light collecting area microlenses 44) may be modulated to create a third effective exposure level that is less than the effective exposure level associated with sub-pixels R2/G2/B2. FIG. 7 is an illustrative diagram showing how a third effective exposure may be used for a subset of the low-exposure sub-pixels on array 20. As shown in FIG. 7, each pixel 22 may include a sub-pixel 34 having a corresponding third effective exposure level (e.g., green sub-pixels G3, red sub-pixels R3, and blue sub-pixels B3 may have the third effective exposure level). The example of FIG. 7 in which the top-right sub-pixel 34 of each pixel 22 is replaced with a sub-pixel having the third effective exposure level is merely illustrative. In general, any of sub-pixels G2/B2/R2 may be replaced with a corresponding sub-pixel G3/B3/R3 having the third effective exposure level.

In one suitable arrangement, image sensor 16 may provide sub-pixels G3/B3/R3 with the third sensitivity by performing pulsed integration operations on those sub-pixels. If desired, image sensor 16 may perform pulsed integration operations using shutter gates 39 and transfer gates 52 as shown in FIG. 3. For example, shutter gate 39 may be pulsed dynamically and repeatedly during a frame capture. Each cycle of dynamic shutter operation may include a period of time when shutter 39 is open (i.e., when SG is low) and a period of time when shutter 39 is closed (i.e., when SG is high). When shutter 39 is closed, charge is drained from the corresponding sub-pixel 34 and discarded. When shutter 39 is open, charge is acquired on sub-pixel 34. At the end of each cycle, transfer gate TX may be pulsed to transfer charge that has accumulated on sub-pixel 34 during the cycle to charge storage region 54. If desired, microlenses such as small-area microlenses 44 of FIG. 5 may be formed over sub-pixels G2/B2/R2 and/or sub-pixels G3/B3/R3. Such small-area microlenses may, if desired, have negative curvature for redirecting image light away from those sub-pixels and/or for redirecting image light onto high effective exposure sub-pixels G1/B1/R1.

Figure 8:
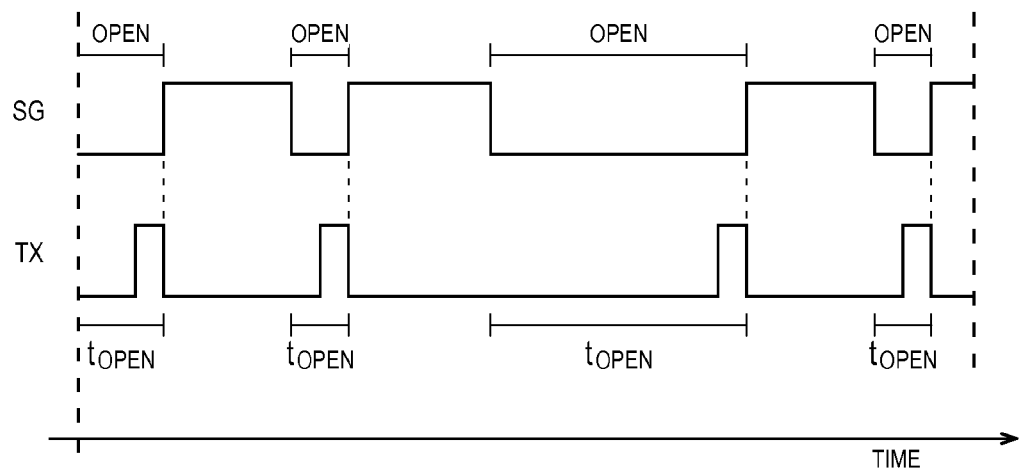
FIG. 8 is an illustrative timing diagram showing how sub-pixels in a pixel array may be operated in a pulsed integration mode to exhibit a desired effective exposure for performing high-dynamic-range imaging in accordance with an embodiment of the present invention.

FIG. 8 is a timing diagram illustrating how pulsed integration operation may be implemented in a given sub-pixel 34. As shown in FIG. 8, shutter control signal SG may be pulsed multiple times during an image frame. When signal SG is low, shutter 39 is OPEN and charge is allowed to accumulate on photodiode 34. When SG is high, shutter 39 is closed. A "shutter cycle" may be used herein to refer to a period that includes one closed period in which SG is high and one OPEN period in which SG is low.

At the end of each OPEN period, signal TX is pulsed to transfer the charge that was accumulated during the OPEN period to floating diffusion node 54. Each OPEN period may have any desired duration. Charge acquisition time $t_{open}$ for each cycle is defined as the time between the falling edge of the SG pulse and the falling edge of the subsequent TX pulse. The charge acquisition times in a given image frame need not have the same duration $t_{open}$. The total charge acquisition time T of sub-pixel 34 during an image frame capture (sometimes referred to as the total pixel exposure time T) may be defined as the sum of all $t_{open}$ during the frame acquisition time.

Charge may be transferred from photodiode 34 to floating diffusion node 54 using a short TX pulse at the end of each shutter cycle. During readout time, accumulated charge on floating diffusion node 54 may be converted to a corresponding pixel signal Vout using, for example, using a known correlated double sampling technique.

Because $t_{open}$ is much shorter than the length of an image frame, multiple shutter cycles may fit into a portion of a frame length or into the entire frame length without compromising pixel exposure timing (i.e., while maintaining the desired total pixel exposure time T). By breaking up the total exposure time T during an image frame into shorter, non-continuous integration periods, image artifacts caused by moving objects, flickering lighting, and objects with changing illumination may be minimized without compromising pixel exposure time (i.e., while maintaining the desired total exposure time T). The duration of total exposure time T may be adjusted so that sub-pixels G3/B3/R3 have the desired third effective exposure that is less than the effective exposure of sub-pixels G2/B2/R2.

If desired, sub-pixels G1/R1/B1 and sub-pixels G2/R2/B2 of array 20 may begin integrating charge at approximately the same time (e.g., prior to or approximately at the beginning of integrating charge using pulsed integration for sub-pixels G3/R3/B3 as shown in FIG. 8). By operating sub-pixels G1/R1/B1 and G2/R2/B2 with different effective sensitivities (exposures), sub-pixels G1/R1/B1 may be operated with the same integration time as sub-pixels G2/R2/B2. Sub-pixels G1/R1/B1 and G2/R2/B2 may thereby end integrating charge for a given frame at approximately the same time. Sub-pixels G3/R3/B3 may perform pulsed integration using signals SG and TX as shown in FIG. 8 between the beginning of charge integration of sub-pixels G/1/R1/B1 (and G2/B2/R2) and the end of charge integration of sub-pixels G1/R1/B1 (and G2/B2/R2). In this way, the total exposure time for sub-pixels B3/G3/R3 may be less than the total exposure time for sub-pixels B2/G2/R2, thereby providing sub-pixels B3/G3/R3 with a third effective exposure (sensitivity) that is less than the effective exposure of sub-pixels B2/G2/R2 (and significantly less than the effective exposure of sub-pixels B1/G1/R1). By providing sub-pixels B1/G1/R1, B2/G2/R2, and G3/G3/R3 with overlapping exposure times, motion artifacts may be mitigated between the three sets of sub-pixels having the three different effective sensitivities.

The timing of shutter pulses may have any desired pattern. For example, the first pulse (e.g., the first pulses of signals SG and TX) for a given frame may be asserted for sub-pixels G3/B3/R3 at or near the beginning of charge integration for that given frame using high sensitivity sub-pixels R1/G1/B1 (or at or near the beginning of charge integration for that frame using low sensitivity sub-pixels R2/G2/B2). Similarly, if desired, the last pulse (e.g., the last pulses of signals SG and TX) for the given frame may be asserted for sub-pixels G3/B3/R3 at or near the end of charge integration for that given frame using high sensitivity sub-pixels R1/G1/B1. In this way, the amount of motion in the imaged scene will be uniform between the three channels (e.g., image signals captured by sub-pixels R1/G1/B1, by sub-pixels R2/G2/B2, and by sub-pixels R3/G3/B3), thereby mitigating any motion artifacts that may arise in the final image.

Total pixel exposure time T for minimum effective exposure level sub-pixels R3/G3/B3 may be selected (e.g., by determining corresponding times $t_{open}$) such that a desired dynamic range of the final image is met. For example, a desired dynamic range for the final image may be 20 bits, which corresponds to approximately 120 decibels, or a million-to-one dynamic range ratio. In this scenario, each pulse of signals SG and TX for pulsed integration sub-pixels R3/G3/B3 may be spaced approximately uniformly in time, with the pulses being as short in duration and as numerous as possible for the given image sensor 16 while maintaining a total exposure time T to achieve the required dynamic range. Such an approach will result in motion blur for sub-pixels R3/G3/B3 being approximately the same as motion blur for sub-pixels R1/G1/B1 and R2/G2/B2 (e.g., because sub-pixels R3/G3/B3 sample motion densely and evenly in this scenario).

In some situations, scenes that are imaged by image sensor 16 may contain rapidly pulsed light sources (e.g., pulses that may pulse more rapidly than is detectable by the human eye) such as light emitting diodes (LEDs) in automotive brake lights, stop lights, etc. In these scenarios, objectionable artifacts may be generated in the final image when the pulsed integration times associated with sub-pixels R3/G3/B3 are approximately equal to an integer multiple of the pulse frequency of the pulsed light source. This can result in the pulsing light sources being rendered in a flickering fashion, being captured at the wrong color, or being missed completely from the image capture (e.g., when the pulsing light source has brightness maxima that fall exactly between the R3/G3/B3 integration pulses). In order to mitigate such flickering light source problems, the spacing between pulses of SG and TX for sub-pixels R3/G3/B3 may be non-uniform so that the pulsed light sources do not stay locked at a constant phase (e.g., so that the proper image of the pulsed light source is obtained by averaging all of the integration pulses for sub-pixels R3/G3/B3). The spacing may be made non-uniform by, for example, slightly perturbing the spacing between some of the pulses of signals SG and TX provided to sub-pixels R3/G3/B3, by providing the pulses with pseudo-random spacing over time, etc. As an example, the spacing may be made non-uniform by providing the pulse spacing with a coefficient of variation that is greater than zero and less than 25%. In general, greater deviations from uniform spacing may better mitigate flickering light sources at some common LED flicker frequencies while increasing capture of other flicker frequencies (e.g., modest deviations from uniform spacing may provide a balance for mitigating frequencies at common LED flicker frequencies and other flicker frequencies).

All image pixel arrays exhibit at least some crosstalk. Crosstalk may be defined herein as a signal that is generated at a photodiode that resides in a different pixel from that containing the color filter volume through which the associated light photon passed. For example, in a Bayer mosaic array, a photon may pass through a green color filter but produce a signal in an adjacent red or blue photodiode. In general, crosstalk experienced by array 20 may include optical and/or electrical crosstalk. Electrical crosstalk occurs when a photon generates an electron in the correct photodiode, but the electron migrates to the photodiode of a different pixel. Optical crosstalk occurs when a photon passes through a color filter volume at a high angle or is scattered so as to produce an electron in a different photodiode. While crosstalk may limit the maximum possible exposure ratios (e.g., ratio between the high effective exposure associated with sub-pixels G1/R1/B1 and the low effective exposure associated with sub-pixels G2/R2/B2) in sensor 16, sensor 16 may, if desired, utilize crosstalk to perform high-dynamic-range imaging.

If desired, crosstalk signals in array 20 can be made approximately proportional to the desired principal image signal, but at much lower sensitivity. If desired, one or more sub-pixels 34 in array 20 may be provided with an image light blocking layer such that those sub-pixels are crosstalk dominated sub-pixels (e.g., such that the signals generated by those sub-pixels are generated in response to crosstalk without contributions from direct image light). Such sub-pixels may allow for capture of the brightest portions of an imaged scene without saturation/clipping and without requiring a pulsed integration scheme.

In general, most crosstalk in array 20 occurs between immediately adjacent sub-pixels 34 that share an edge. In the example of FIG. 5, if the G2/B2/R2 sub-pixels 34 in array 20 were to be provided with a metal shield or highly absorbing color filter material, those sub-pixels 34 would generate signals primarily via crosstalk from the four adjacent sub-pixels G1/B1/R1. However, two of the four photodiodes 34 adjacent to any given photodiode G2/B2/R2 will be of the wrong color. If desired, array 20 may be provided with an arrangement of the type shown in FIG. 9 for utilizing crosstalk to perform high dynamic range imaging.

Figure 9:
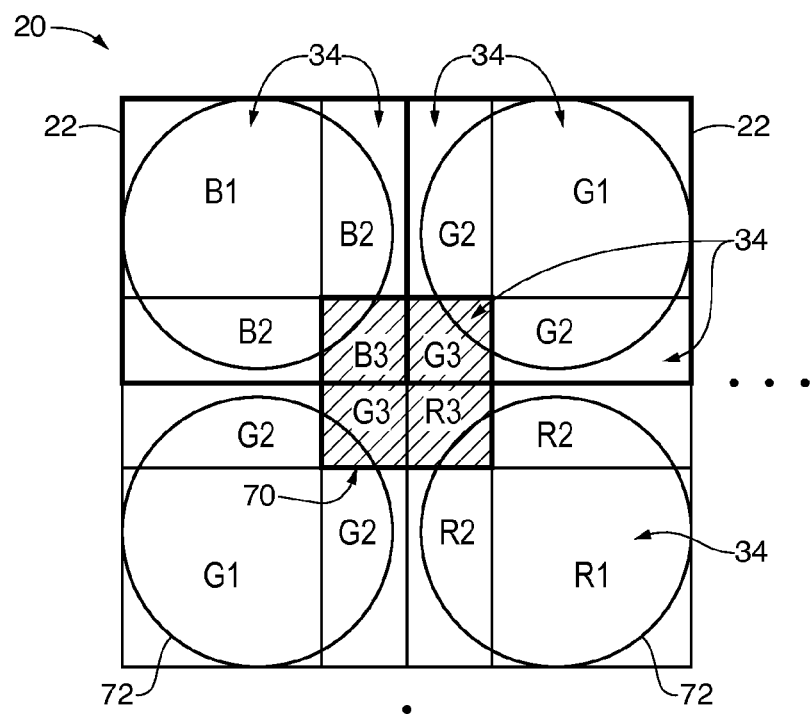
FIG. 9 is a diagram of an illustrative pixel array having sub-pixels with shared charge storage nodes and that share a common color filter and that have different sub-pixel areas, microlens arrangements, and opaque layers to provide three different effective exposure levels for generating high-dynamic-range images in accordance with an embodiment of the present invention.

As shown in FIG. 9, array 20 may include relatively high effective exposure sub-pixels 34 (e.g., relatively high effective exposure blue sub-pixels B1, relatively high effective exposure red sub-pixels R1, and relatively high effective exposure green sub-pixels G1), relatively low effective exposure sub-pixels 34 (e.g., relatively low effective exposure blue sub-pixels B3, relatively low effective exposure red sub-pixels R3, and relatively low effective exposure green sub-pixels G3), and intermediate effective exposure sub-pixels 34 (e.g., intermediate effective exposure green sub-pixels G2, intermediate effective exposure red sub-pixels R2, and intermediate effective exposure blue sub-pixels B2). In this example, relatively low effective exposure sub-pixels B3/G3/R3 may be operated without a pulsed integration scheme if desired.

Relatively low effective exposure sub-pixels B3/G3/R3 may be provided with an opaque layer 70 such as a metal layer that blocks direct image light from being captured by sub-pixels B3/G3/R3 (e.g., so that signals captured by sub-pixels B3/G3/R3 are dominated by crosstalk). In another suitable example, layer 70 may include optically opaque (e.g., dark) color filter elements formed over photodiodes 34. Relatively low effective exposure sub-pixels G3/R3/B3 may be formed adjacent to each other and surrounded by relatively high effective exposure sub-pixels G1/R1/B1 and intermediate effective exposure sub-pixels G2/R2/B2. Relatively low effective exposure sub-pixels B3/G3/R3 may generate signals that are dominated by crosstalk from adjacent, higher-exposure sub-pixels. As each relatively low effective exposure sub-pixel B3/G3/R3 is only adjacent to higher exposure sub-pixels of the same color, relatively low effective exposure sub-pixels B3/G3/R3 may capture signals of the correct color with a sensitivity that is less than the sensitivity of sub-pixels B2/G2/R2 that are formed without opaque layer 70. As an example, if the crosswalk rate is 1% per edge, sub-pixels B3/G3/R3 would be about 2% as sensitive as intermediate sensitivity sub-pixels G2/B2/R2 (e.g., a 50:1 exposure ratio). Signals captured by sub-pixels B3/G3/R3 may subsequently be used for generating high-dynamic-range images.

If desired, microlenses 72 may be centered over relatively high effective exposure sub-pixels G1/R1/B1 and may extend over the adjacent sub-pixels in array 20 to ensure that sub-pixels G1/R1/B1 have a desired sensitivity that is greater than the sensitivity of sub-pixels G2/R2/B2 by a desired amount. If desired, microlenses 72 may be centered over a corresponding high effective exposure sub-pixel without being centered over the center of the corresponding high effective exposure sub-pixel (e.g., microlens 72 may have its center overlap a portion of a corresponding high effective exposure sub-pixel at a location other than the center of that sub-pixel). Similarly, microlenses 72 may be formed at a location so that the microlenses are not centered with respect to the corresponding group 22 of sub-pixels 34 (e.g., so that the center of microlens 72 does not align with the center of a pixel 22 over which the microlens is formed). It may be advantageous for the photodiode in B1/G1/R1 to be biased towards the corner of the sub-pixel that lies closest to the center of the microlens 72. This example is merely illustrative. In general, there is flexibility in the sizes and shapes of the sub-pixels. In the example of FIG. 9, sub-pixels B3/G3/R3 have been formed with a relatively small area, which does not reduce the effective linear full well of sub-pixels B3/G3/R3, because their charge is transferred to the floating diffusion after each integration pulse. Sub-pixels B2/G2/R2 are somewhat smaller than B1/G1/R1 in this example, which reduces the linear full well of those sub-pixels B2/G2/R2. However, if sufficient light that would have fallen on sub-pixels B2/G2/R2 is redirected by microlenses 72 into sub-pixels B1/G1/R1, this reduction in linear full well may be acceptable, because sufficient effective exposure extension can be achieved.

The example of FIG. 9 is merely illustrative. If desired, sub-pixels B1/R1/G1 and B2/R2/G2 may have any desired shape and/or arrangement. For example, sub-pixels 34 may be provided with beveled corners. Microlenses 72 may be formed over any desired number of sub-pixels 34 in any desired arrangement. If desired, microlenses 72 may have an asymmetric shape to provide the desired exposure ratios between the set of relatively high effective exposure sub-pixels G1/R1/B1, the set of relatively low effective exposure sub-pixels G3/R3/B3, and the set of intermediate effective exposure sub-pixels G2/R2/B2.

The examples of FIGS. 1-9 are merely illustrative and do not serve to limit the scope of the present invention. If desired, the arrangements, shapes, and sizes of sub-pixels 34 as shown in FIGS. 1-9 may be combined in any desired manner to provide with the desired exposure ratio between each set of sub-pixels (e.g., to provide the final HDR image with a desired extended dynamic range). While sub-pixels R1/G1/B1 and sub-pixels R2/G2/B2 may have the same integration times (e.g., to mitigate motion artifacts between the channels), sub-pixels R1/G1/B1 may, in general, have different integration times than sub-pixels R2/G2/B2 (e.g., to further increase the exposure time of one of the sub-pixel sets to provide a desired dynamic range to the final image).

The examples of FIGS. 1-9 in which array 20 is provided with either two sets of sub-pixel sensitivities (e.g., as shown in FIGS. 4 and 5) or three sets of sub-pixel sensitivities (e.g., as shown in FIGS. 7 and 9) is merely illustrative. If desired, greater than three sets of sensitivities may be used for generating desired HDR images. The sensitivity of each of the sets of sub-pixels may be tuned using any combination of the techniques and systems described above in connection with FIGS. 1-9. For example, there may be four different sensitivities for each pixel 22 (e.g., each sub-pixel 34 in pixel 22 may have a different effective exposure). This approach may minimize visibility of signal-to-noise ratio (SNR) transitions in the final image. If desired, image sensor 16 may feather in the transition by mixing signals from high and low sensitivity channels slightly below the SNR transition. This may reduce SNR at those levels while decreasing the magnitude of the transition when the higher-exposure channel saturates and requires switching to the lower-exposure channel.

In general, each pixel 22 may include any desired number of sub-pixels (photodiodes) 34 arranged in any desired shape. For example, pixels 22 may include two rows by two columns of sub-pixels (as shown in FIGS. 4, 5, 7, and 9), may include three rows by three columns of sub-pixels, etc. Although the example of FIGS. 1-9 is described as implementing a Bayer mosaic pattern of repeating unit cells of color filter elements, any desired color filter elements having any desired colors and patterns may be used. In one suitable arrangement, the green sub-pixels 34 described in connection with FIGS. 1-9 may be replaced by broadband color filter elements (e.g., clear or yellow color filter elements) to improve SNR at lower light levels relative to Bayer mosaic patterns.

Figure 10:
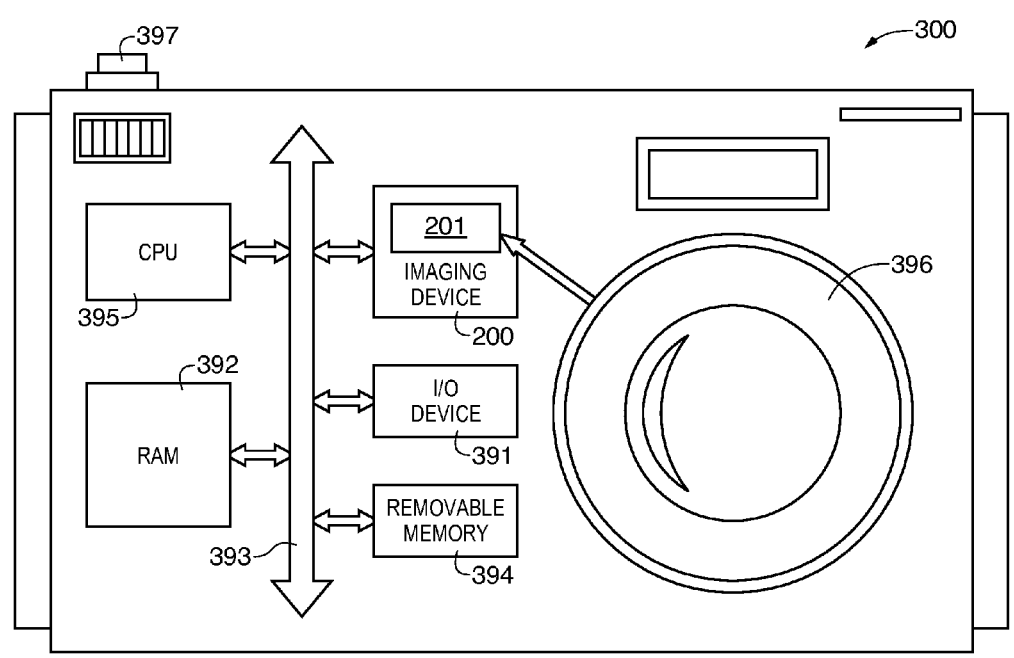
FIG. 10 is a block diagram of a processor system employing the embodiments of FIGS. 1-9 in accordance with an embodiment of the present invention.

FIG. 10 shows in simplified form a typical processor system 300, such as a digital camera, which includes an imaging device 200 (e.g., an imaging device 200 such as device 10 of FIGS. 1-9 and the techniques for capturing high-dynamic-range images using pixel arrays having photosensitive regions with differential sensitivities). The processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

The processor system 300 generally includes a lens 396 for focusing an image on pixel array 20 of device 200 when a shutter release button 397 is pressed, central processing unit (CPU) 395, such as a microprocessor r which controls camera and one or more image flow functions, which communicates with one or more input/output (I/O) devices 391 over a bus 393. Imaging device 200 also communicates with the CPU 395 over bus 393. The system 300 also includes random access memory (RAM) 392 and can include removable memory 394, such as flash memory, which also communicates with CPU 395 over the bus 393. Imaging device 200 may be combined with the CPU, with or without memory storage on a single integrated circuit or on a different chip. Although bus 393 is illustrated as a single bus, it may be one or more busses or bridges or other communication paths used to interconnect the system components.

Various embodiments have been described illustrating systems and methods for generating images using an image sensor pixel array having sub-pixel resolution capabilities and differential sub-pixel exposures (sensitivities) for generating high-dynamic-range images.

An image sensor may include an array of photodiodes or other photosensitive regions arranged in rows and columns. The photodiodes may be arranged in groups (clusters) of adjacent photodiodes that share a common floating diffusion (charge storage region) and that generate charge in response to light of the same color (e.g., a color filter element is formed over each group to pass light of a respective color to each photodiode in that group). Each group may include, for example, first, second, third, and fourth adjacent photodiodes in the array.

Microlenses may be formed over the array of photodiodes in a checkerboard pattern. For example, a first microlens may be centered over the first photodiode in each group and may have portions that extend over the second and third photodiodes in that group, whereas a second microlens may be centered over the fourth photodiode in each group and may have portions that extend over the second and third photodiodes in that group. If desired, the second and third photodiodes may be formed with corresponding smaller-area microlenses or may be formed without centered microlenses. In this way, the first and fourth photodiodes in each group may have an effective exposure (sensitivity) that is greater than the effective exposure of the second and third photodiodes in each group. This effective exposure differential may be utilized by the image sensor to generate high-dynamic-range images.

If desired, row control circuitry in the image sensor may control one or more of the photodiodes in each group to perform pulsed integration operations in which charge in the photodiode is intermittently transferred to at least one of the shared floating diffusion node and a blooming node. The pulsed integration operations may, for example, be performed by repeatedly pulsing transfer gate control signals. The spacing between the signals may be made non-uniform to mitigate any flickering that may occur in the imaged scene. The photodiodes on which pulsed integration operations are performed may have an effective exposure that is different from the two other effective exposures generated in each group, thereby allowing further extension of the dynamic range in the final dynamic range image.

If desired, a substantially opaque element may be formed over one or more photodiodes in each of the groups such that the corresponding photodiodes generate signals in response to crosstalk from the other photodiodes of the corresponding group without generating charge in response to image light. In this way, the covered photodiodes may have an effective exposure that is different from the two other effective exposures generated in each group. One or more of these methods may be combined. The arrangement of the microlenses, the pulsed integration, and the crosstalk dominated photodiodes may be adjusted so that a desired exposure ratio is formed between two or more sets of the photodiodes on the array, thereby allowing for high-dynamic-range images to be formed without motion artifacts and with super-pixel resolution.

The foregoing is merely illustrative of the principles of this invention and various modifications can be made by those skilled in the art without departing from the scope and spirit of the invention. The foregoing embodiments may be implemented individually or in any combination.

What is claimed is:

1. An imaging system, comprising:
    an array of photodiodes arranged in rows and columns, wherein the array includes a group of photodiodes and wherein the group of photodiodes comprises first, second, third, and fourth adjacent photodiodes in the array;
    at least one color filter element formed over the group of photodiodes, wherein the at least one color filter element is configured to pass light of a common color to each photodiode in the group of photodiodes;
    a first microlens that is optically aligned with the first photodiode and that has portions that extend over the second and third photodiodes; and
    a second microlens that is optically aligned with the fourth photodiode and that has portions that extend over the second and third photodiodes.

2. The imaging system defined in claim 1, wherein the array further comprises an additional group of photodiodes that is adjacent to the group of photodiodes and wherein the additional group of photodiodes comprises fifth, sixth, seventh, and eighth photodiodes, the imaging system further comprising:
    at least one additional color filter element formed over the additional group of photodiodes, wherein the at least one additional color filter element is configured to pass light of an additional common color that is different from the common color to each photodiode in the additional group of photodiodes;
    a third microlens that is optically aligned with the fifth photodiode and that has portions that extend over the second photodiode, the sixth photodiode, and the seventh photodiode; and
    a fourth microlens that is optically aligned with the eighth photodiode and that has portions that extend over the sixth and seventh photodiodes.

3. The imaging system defined in claim 1, wherein the first and fourth photodiodes have a first sensitivity, the second and third photodiodes have a second sensitivity, and the first sensitivity is greater than the second sensitivity.

4. The imaging system defined in claim 1, wherein the first and fourth photodiodes have a first sensitivity and the second photodiode has a second sensitivity, and wherein the first sensitivity is greater than the second sensitivity, the imaging system further comprising:
    row control circuitry, wherein the row control circuitry is configured to perform pulsed integration operations on the third photodiode so that the third photodiode has a third sensitivity that is less than the second sensitivity.

5. The imaging system defined in claim 1, wherein the second and third photodiodes are formed without any corresponding microlenses centered above the second and third photodiodes.

6. The imaging system defined in claim 5, wherein the first microlens is deposited using a first reticle, the second microlens is deposited using a second reticle, and the second microlens is deposited over the first microlens so that the second microlens at least partially overlaps the first microlens.

7. The imaging system defined in claim 5, further comprising:
a top conformal coating layer formed over the first and second microlenses.

8. The imaging system defined in claim 1, further comprising:
a third microlens formed over the second photodiode; and
a fourth microlens formed over the third photodiode, wherein the first and second microlenses have a first light collecting area and the third and fourth microlenses have a second light collecting area that is less than the first light collecting area.

9. The imaging system defined in claim 1, further comprising:
a camera lens that focuses image light onto the array of photodiodes, wherein the camera lens has a chief ray angle; and
a plurality of microlenses, wherein the plurality of microlenses comprises the first and second microlenses, and wherein the each of microlenses of the plurality of microlenses are optically aligned with a portion of a respective corresponding photodiode to account for the chief ray angle of the camera lens.

10. An image sensor, comprising:
an array of photodiodes arranged in rows and columns, wherein the array comprises a plurality of photodiode clusters, wherein each photodiode cluster includes at least four adjacent photodiodes that capture light of a common color and that are coupled to a common charge storage node via respective charge transfer gates; and
row control circuitry, wherein the row control circuitry is configured to:
control at least a first photodiode in each cluster to capture an image using a first integration time;
control at least a second photodiode in each cluster to capture the image using a second integration time that is approximately equal to the first integration time; and
control a third photodiode in each cluster to perform pulsed integration operations to capture the image, wherein performing the pulsed integration operations comprises transferring charges from the third photodiode to the common charge storage node during at least first and second intervals, and wherein the first and second intervals overlap with the first integration time of the first photodiode.

11. The image sensor defined in claim 10, wherein the third photodiode is coupled to the common charge storage node via a first transistor and to a voltage source by a second transistor and wherein the row control circuitry is configured to control the third photodiode in each of the photodiode clusters to perform the pulsed integration operations by repeatedly pulsing control signals provided to at least one of the first and second transistors.

12. The image sensor defined in claim 11, wherein the row control circuitry is configured to repeatedly pulse the control signals provided to the at least one of the first and second transistors by providing a sequence of control signal pulses having non-uniform spacing in time to the at least one of the first and second transistors.

13. The image sensor defined in claim 10, further comprising:
processing circuitry, wherein the processing circuitry is configured to generate a high-dynamic-range image based on image signals captured by the first, second, and third photodiodes in each of the clusters.

14. The image sensor defined in claim 10, wherein charges from the third photodiode are drained during at least third and fourth intervals, wherein the first and second intervals are non-overlapping with the third and fourth intervals, wherein the third and fourth intervals overlap with the first integration time of the first photodiode, wherein the third photodiode is coupled to the common charge storage node via a first transistor and to a voltage source by a second transistor, wherein transferring charges from the third photodiode to the common charge storage node during the at least first and second intervals comprises using the row control circuitry to repeatedly pulse control signals provided to the first transistor, and wherein draining charges from the third photodiode during the third and fourth intervals comprises using the row control circuitry to repeatedly pulse control signals provided to the second transistor.

15. A system, comprising:
a central processing unit;
memory;
input-output circuitry; and
an imaging device, wherein the imaging device comprises:
an array of photosensitive regions arranged in rows and columns, wherein the array comprises a plurality of groups of photosensitive regions, wherein each group includes at least first, second, third, and fourth adjacent photosensitive regions on the array that share a common floating diffusion node;
a camera lens that focuses image light onto the array; and
a substantially opaque element formed over the first photosensitive region in each of the groups of photosensitive regions, wherein the first photosensitive region in each of the groups of photosensitive regions is configured to generate charge in response to crosstalk from the second, third, and fourth photosensitive regions of that group without generating charge in response to the image light.

16. The system defined in claim 15, wherein the substantially opaque element comprises a metal layer.

17. The system defined in claim 15, wherein the substantially opaque element comprises a dark color filter element.

18. The system defined in claim 15, further comprising:
a dominant microlens in each group, wherein the dominant microlens in each group is optically aligned with a portion of the third photosensitive region in that group accounting for a chief ray angle of the camera lens.

19. The system defined in claim 18, wherein the first photosensitive region in each of the groups of photosensitive regions shares edges with only the first photosensitive region in at least one other group and shares edges with the fourth and second photosensitive regions in its corresponding group.

20. The system defined in claim 15, further comprising:
pixel control circuitry, wherein the pixel control circuitry is configured to operate at least one photosensitive region in each of the groups of photosensitive regions in a pulsed integration mode in which charge in the at least one photosensitive region is intermittently transferred to at least one of the floating diffusion node and a blooming node.

* * * * *